United States Patent [19]

Acker

[11] 4,333,621
[45] Jun. 8, 1982

[54] SHOCK ABSORBING MECHANISM FOR A PARACHUTE SUPPORTED LOAD

[76] Inventor: Otto H. Acker, P.O. Box 2, Washougal, Wash. 98671

[21] Appl. No.: 34,288

[22] Filed: Apr. 30, 1979

[51] Int. Cl.³ .............................................. B64D 1/14
[52] U.S. Cl. .................................. 244/138 R; 188/67; 188/129; 244/100 R; 293/133
[58] Field of Search ........... 244/100 R, 138 R, 138 A; 188/67, 129; 267/9 R, 9 B, 9 C; 293/133

[56] References Cited

U.S. PATENT DOCUMENTS

| 1,362,990 | 12/1920 | Gilman | 188/67 |
| 1,746,928 | 2/1930 | Chausse | 188/129 |
| 3,145,012 | 8/1964 | Kfoury | 267/9 C |
| 3,295,798 | 1/1967 | Webb | 244/100 R |
| 3,387,805 | 6/1968 | Barnett et al. | 244/138 R |
| 3,861,717 | 1/1975 | Knox | 188/67 |

FOREIGN PATENT DOCUMENTS 1445902  6/1966  France ........................... 244/138 R Primary Examiner—Galen L. Barefoot
Attorney, Agent, or Firm—Eugene M. Eckelman

[57] ABSTRACT

A load support is arranged to be connected to a parachute and has a center guide tube slidably receiving a landing rod. This landing rod is of a sufficient length to project beyond the lower end of the guide tube so as to engage the ground ahead of the load support. A slidable friction connection is provided between the landing rod and the load support for cushioning the landing shock of such support. Brake pads are used as the friction connection, and such brake pads are associated with adjustment apparatus comprising a rotatable holder for the brake pads and a cam and cam follower assembly which serves to adjust the compression of the brake pads on the rod upon rotation of the holder. A pinion and gear connection is provided between the holder and the support to provide the rotatable adjustment.

5 Claims, 5 Drawing Figures

U.S. Patent    Jun. 8, 1982    4,333,621

SHOCK ABSORBING MECHANISM FOR A PARACHUTE SUPPORTED LOAD

BACKGROUND OF THE INVENTION

This invention relates to new and useful improvements in shock absorbing mechanisms for a parachute supported load.

Parachute supported loads have heretofore been provided with shock absorbing mechanism which for example have cushioning feet or cushioning spikes that engage the ground. While such devices dissipate some of the falling energy of a parachute load, the amount of energy dissipated is not sufficient to materially reduce the shock to a load so as to prevent damage to the load.

SUMMARY OF THE INVENTION

According to the present invention and forming a primary objective thereof, a shock absorbing mechanism for a parachute supported load is provided having a novel structure which is capable of dissipating the falling energy of the load so as to substantially eliminate damage to the load when it hits the ground.

It is often desired to drop supplies and the like by parachute such as when there is no convenient access to the area to be supplied. Such areas may for example comprise areas occupied by forest fire fighters or other emergency personnel, military personnel, or isolated persons. In dropping supplies by parachute, the supplies are practically always damaged and oftentimes completely destroyed.

In carrying out the invention, support means for a load have connecting means arranged to be connected to a parachute. Guide means are secured vertically through said support means and open through the upper and lower ends thereof. A landing rod is slidable in such guide means and friction means operate between this landing rod and the guide means. The landing rod is of a length to project beyond the lower end of the load support and upon proper engagement of the friction means the landing shock of the load support is cushioned sufficiently to prevent damage to the load. In a preferred construction, the friction means comprises brake pads mounted on the load support and engageable with the surfaces of the landing rod. The brake pads are adjustable by a cam and cam follower arrangement operated in selected adjusted positions by a pinion and gear connection.

The invention will be better understood and additional objects and advantages will become apparent from the following description taken in connection with the accompanying drawings.

DETAILED DESCRIPTION OF A PREFERRED EMBODIMENT

Figure 2:
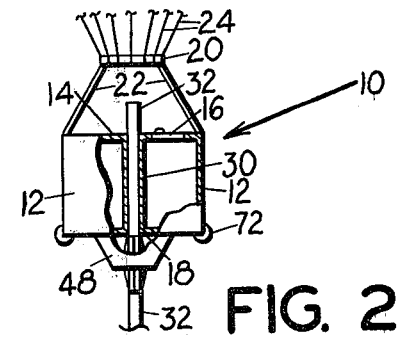
FIG. 2 is a fragmentary side elevational view similar to FIG. 1 but being broken away to show internal structure.
Figure 1:
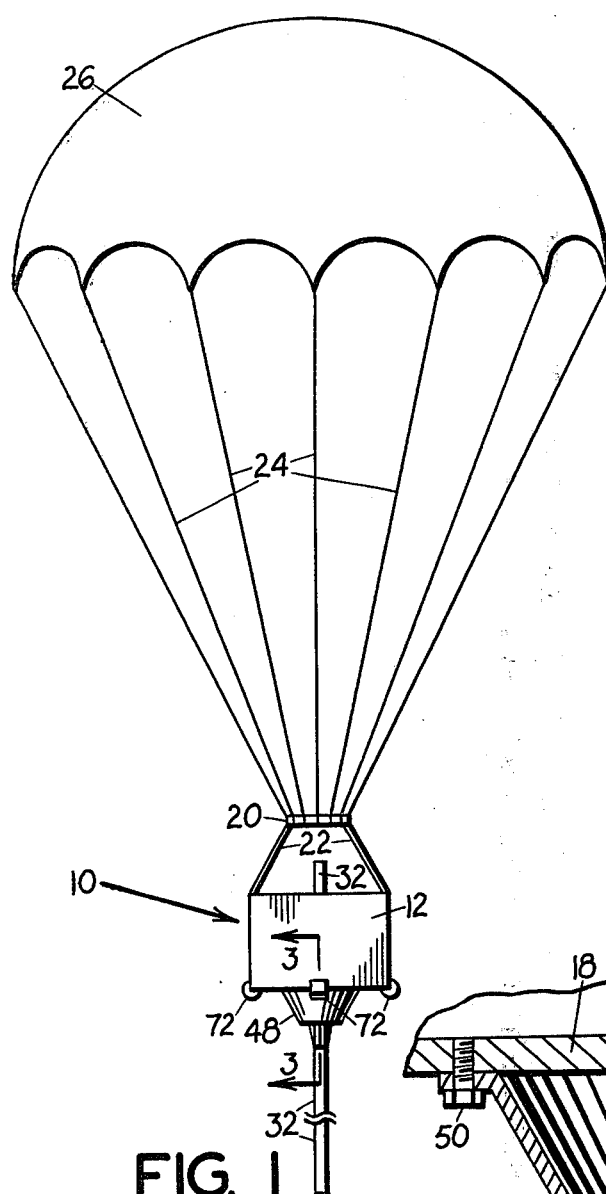
FIG. 1 is an elevational view of the present shock absorbing mechanism for a parachute supported load.

With reference first to FIGS. 1 and 2, the present invention comprises a load support 10 for supporting a load. Although this support may take various forms, it is illustrated as comprising a container having defining side walls 12, a top wall 14 with a hatch 16 or the like to provide load access to the interior thereof, and a bottom wall 18. An upper portion of the container 10 has connection to a ring 20 by means of flexible lines 22, and ring 20 is arranged for connection to the strands 24 of a parachute 26.

Figure 3:
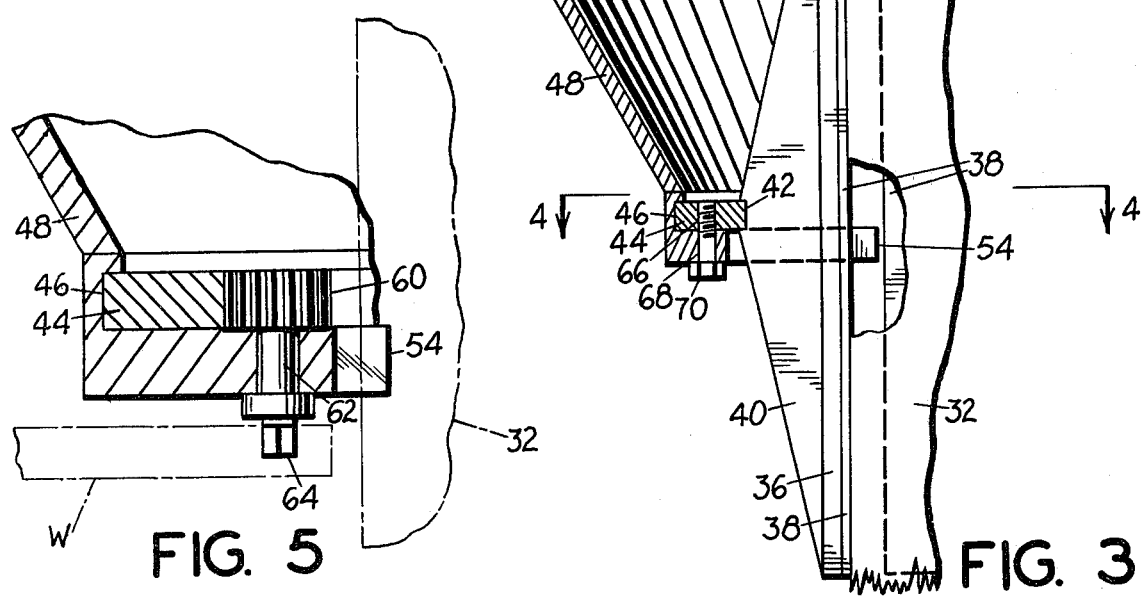
FIG. 3 is an enlarged fragmentary sectional view taken on the line 3—3 of FIG. 1.

Container 10 has an integral center guide tube 30, also partially visible in FIG. 3, which is open at the top and bottom. Slidable in tube 30 for guided movement is a landing rod 32. This rod, as best seen in FIG. 1, is of substantial length and is arranged to project a considerable distance below the container 10.

Figure 4:
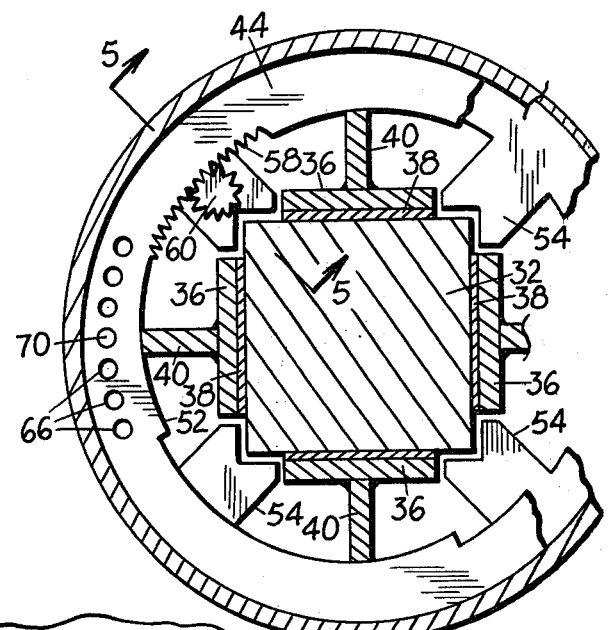
FIG. 4 is a fragmentary sectional view taken on the line 4—4 of FIG. 3.

Friction means are associated with the landing rod 32 so as to provide a shock absorbing mechanism as the load support nears the ground. Such friction mechanism comprises brake shoes 36 having friction pads 38 engageable with the surface of the landing rod 32. As best seen in FIG. 4, the landing rod is rectangular in cross section and a brake shoe 36 is disposed on each side thereof. Brake shoes 36 have an integral outwardly extending flange 40 having a grooved slidable connection 42, FIG. 3, with an annular holder 44 rotatably mounted in a horizontal groove 46 in the lower end of a housing 48 secured as by bolts 50 to the bottom wall 18 of the container 10.

With reference to FIG. 4, annular holder 44 has a cam portion 52 on its inner edge for each of the brake shoes, the flanges 40 of the brake shoes being in respective cam follower slidable engagement with the cam edges 52. The brake shoes 36 are held laterally in place by corner guides 54 integral with the housing 48, one of such guides also being shown in FIG. 5.

Figure 5:
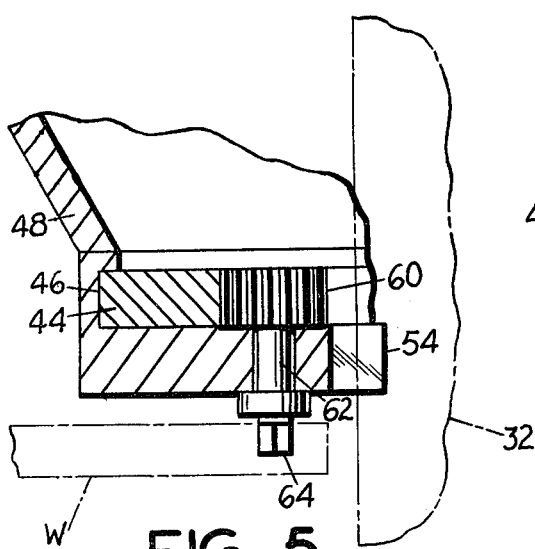
FIG. 5 is a fragmentary sectional view taken on the line 5—5 of FIG. 4.

The amount of friction compression of the brake pads 38 against the landing rod 32 is controlled by the cammed engagement between flanges 40 and the cam edges 52, and for the purpose of controlling such compression as well as to provide a takeup for wear, the annular holder 44 has an inner segment of gear teeth 58 and one of the guides 54 has a pinion gear 60 rotatably supported thereon and engageable with the gear teeth 58. As best seen in FIG. 5, the support shaft 62 for the pinion gear 60 extends below the housing and terminates in a wrench engaging head 64 arranged for removable engagement by a wrench W shown in broken lines. With reference to FIGS. 3 and 4, annular holder 44 has a plurality of closely spaced threaded bores 66, and the bottom of the housing 48 has an aperture 68 on the radius of the bores 66 and arranged to receive a holding screw 70. In order to provide the necessary friction compression of the brake shoes or to take up or release the brakes, it is merely necessary to remove the holding screw 70 and provide the necessary adjustment by means of the wrench W. When such adjustment is completed, the holding screw 70 is reinserted in the proper bore 66.

In the operation of the present shock absorbing mechanism, the landing rod is initially set so as to project the desired distance beyond the bottom of the load support 10. Such projecting distance may be several feet or longer, depending upon the weight of the load, the speed of descent, and the setting of the brake shoes, it being preferred that an arrangement be selected such that when the load support reaches the ground at the bottom shock absorbing function of the landing rod, the bottom of the landing rod will be approximately moved up to the bottom of the brake assembly so that an efficient cushioning will take place. The container 10 will eventually tip slightly as the parachute collapses, but upon proper setting of the length of the landing rod and the friction compression of the brake shoes, such landing rod will be fully telescoped and the container will tip only slightly from the center projection. The corners of the container 10 preferably have cushioning feet 72.

It is to be understood that the form of my invention herein shown and described is to be taken as a preferred example of the same and that various changes in the shape, size and arrangement of parts may be resorted to without departing from the spirit of my invention or the scope of the subjoined claims. For example, a round rod instead of the square rod 32 can be used.

Having thus described my invention, I claim:

1. A shock absorbing mechanism for a parachute supported load comprising
   (a) a load support container having enclosing sides and also having top and bottom wall portions,
   (b) connecting means on said container arranged to connect it to a parachute,
   (c) tube-like guide means integral with said container,
   (d) said guide means being disposed in a central portion of said container and opening through said top and bottom wall portions,
   (e) a landing rod slidable in said guide means,
   (f) and friction brake means operating between said landing rod and said guide means,
   (g) said landing rod being of a sufficient length to project beyond the lower end of said container whereby said landing rod in a parachute landing of said container engages the ground prior to the container and frictionally slides upwardly through said container in said guide means for cushioning the landing shock of said support means.

2. The shock absorbing mechanism of claim 1 wherein said friction means comprises brake pads mounted on said container and engageable with the surfaces of said rod.

3. The shock absorbing mechanism of claim 1 wherein said friction brake means comprises brake pads mounted on said container and engageable with the surfaces of said rod, and adjustment means on said friction means for adjusting the compression of said pads on said rod.

4. The shock absorbing mechanism of claim 3 comprising a rotatable holder for said brake pads, and cam and cam follower adjusting means on said holder and brake pads serving to adjust the compression of said brakes on said rod upon rotation of said holder.

5. The shock absorbing mechanism of claim 3 comprising a rotatable holder for said brake pads, cam and cam follower adjustment means on said holder and brake pads serving to adjust the compression of said brakes on said rod upon rotation of said holder, said adjustment means including a pinion and gear connection between said holder and said support.

* * * * *